United States Patent

[11] 3,582,566

[72] Inventors Elmer C. Henriksen
Chicago;
William J. Pietenpol, Winnetka, both of,
Ill.; Arthur Rak, Altadena, Calif.
[21] Appl. No. 735,681
[22] Filed June 10, 1968
[45] Patented June 1, 1971
[73] Assignee Bell & Howell Company
Chicago, Ill.

[54] SOUND RECORDER CONTROL
6 Claims, 4 Drawing Figs.
[52] U.S. Cl. ................................................ 179/100.2,
200/51.09, 200/51.1, 274/4, 52/12, 352/14
[51] Int. Cl. .......................................................G03b 31/00,
G11b 5/00, H01r 33/30
[50] Field of Search.................................... 179/100.1DR,
100.2MPM, S, Z, 100.1; 274/4; 352/12
14; 200/51.09, 51.10

[56] References Cited
UNITED STATES PATENTS
3,171,902  3/1965  Jones et al. ...................  179/100.2
3,475,563  10/1969  Papst............................  179/100.2
2,823,268  2/1958  Somers........................ 179/100.1DR
3,492,668  1/1970  Thompson...................  179/100.2S Primary Examiner—James W. Moffitt
Assistant Examiner—Howard W. Britton
Attorney—Raymond A. Andrew ABSTRACT: In apparatus for controlling a sound recorder upon actuation of control means remote from said sound recorder, first means for conveying control information from said control means to said sound recorder, said first means being selectively attachable to and detachable from said sound recorder, second means for presetting said sound recorder into a recording mode of opera ion in response to an operation including an attachment of said first means to said sound recorder, and third means responsive to said control information for operating said sound recorder in a recording mode op operation upon said presetting by said second means and actuation of said control means.

INVENTORS:
ELMER C. HENRIKSEN,
WILLIAM J. PIETENPOL,
ARTHUR RAK.

INVENTORS:
ELMER C. HENRIKSEN,
WILLIAM J. PIETENPOL,
ARTHUR RAK.

SOUND RECORDER CONTROL

CROSS-REFERENCES TO RELATED APPLICATIONS

U.S. Pat. application Ser. No. 684,254, entitled "Audiovisual Recoding and Display Methods and Apparatus," filed Nov. 20, 1967, by Joseph H. Lancor, Jr., and assigned to the subject assignee;

U.S. Pat. No. 3,515,470 entitled "Control Information Recording and Sensing Methods and Apparatus," June 2, 1970, by Lewis B. Browder, and assigned to the subject assignee;

U.S. Pat. application Ser. No. 735,861, entitled "Elongate Information Carriers," filed June 10, 1968, by Charles A. Aldridge, and assigned to the subject assignee.

BACKGROUND OF THE INVENTION

1. Field of the Invention

The present invention relates to control apparatus and, more particularly, to apparatus for controlling sound recorders.

2. Description of the Prior Art

The subject invention will be described with reference to the motion picture art, although its utility is not so limited.

In the motion picture art, audiovisual recording systems in which a sound recording apparatus is functionally combined with a motion picture camera have always received considerable attention (see, for instance, U.S. Pat. Nos. 2,052,792, 2,282,957, 2,673,485, 2,679,187, 2,822,722, 2,961,919, 3,278,251, and British Pat. No. 770,372).

Most of the effort in this area has traditionally been directed toward the accomplishment of synchronism between the motion picture film advancement and the sound recording or playback operation. Only few proposals have concerned themselves with the possibility that features may be spoiled because of a faulty operation of the sound equipment. Such a faulty operation is, however, readily possible with the equipment proposed so far.

There are several reasons for this fact. For one thing, unless special safeguards are taken against such an occurrence, it is readily possible that no sound is recorded during the filming of a scene intended by the operator to be accompanied by a sound recording. Systems which provide such a safeguard, on the other hand, generally introduce various operational complications.

For instance, in a typical prior art system it is necessary to operate several switches, including selector switches on the camera and on the sound recorder, before sound-accompanied motion picture taking can take place. This, of course, considerably encumbers the task of the operator whose attention is generally occupied by the scene to be filmed. In fact, it has been found that the provision of a multitude of switches which must be manually actuated to prevent malfunctions of the sound recording equipment in practice leads to more malfunctions and nonfunctions than it prevents.

BRIEF SUMMARY OF THE INVENTION

The subject invention overcomes these problems as will be appreciated as this description proceeds.

From one aspect thereof, the invention resides in apparatus for controlling a sound recorder upon actuation of control means remote from said sound recorder, comprising first means for conveying control information from said control means to said sound recorder, said first means being selectively attachable to and detachable from said sound recorder, second means responsive to an operation including an attachment of said first means to said sound recorder for presetting said sound recorder in a recording mode of operation, and third means responsive to said control information for operating said sound recorder in a recording mode of operation upon said presetting by said second means and actuation of said control means.

From another aspect thereof, the invention resides in an information recording system, comprising (1) recording apparatus for recording information on magnetic recording tape, including selectively actuable first means for moving said tape, selectively actuable second means for recording, in a recording mode of operation, information on a said moving tape, and for reproducing, in a playback mode of operation, recorded information form a said moving tape, and (2) remote control means including means for providing control signals for actuating said first means, means for conveying said control signals to said first means, said conveying means being attachable to and detachable from said recording apparatus and including means for presetting said second means to said recording mode of operation upon an attachment of said conveying means to said recording apparatus.

From yet another aspect thereof, the invention resides in a system for photographing motion picture features and recording sound accompaniments therefor, comprising a motion picture camera including first means actuated in response to the filming of a motion picture feature, a recorder for recording sound on and reproducing recorded sound from magnetic tape, said recorder including selectively actuable second means for moving said tape, selectively actuable third and fourth means for actuating said recorder to a playback mode of operation upon actuation of said fourth means, and for selectively actuating said recorder to a recording mode operation upon actuation of said third and fourth means, and remote control means including fifth means for producing control signals for actuation of said second means in said recorder in response to an actuation of said first means in said camera, and sixth means for conveying said control signals from said camera to said recorder, said sixth means including seventh means selectively attachable to and detachable from said recorder, and eighth means for actuating said third means upon attachment of said seventh means to said recorder.

BRIEF DESCRIPTION OF THE DRAWINGS

The invention and its various aspects will become more readily apparent from following detailed description of preferred embodiments thereof, illustrated by way of example in the accompanying drawings in which.

DESCRIPTION OF PREFERRED EMBODIMENTS

Figure 1:
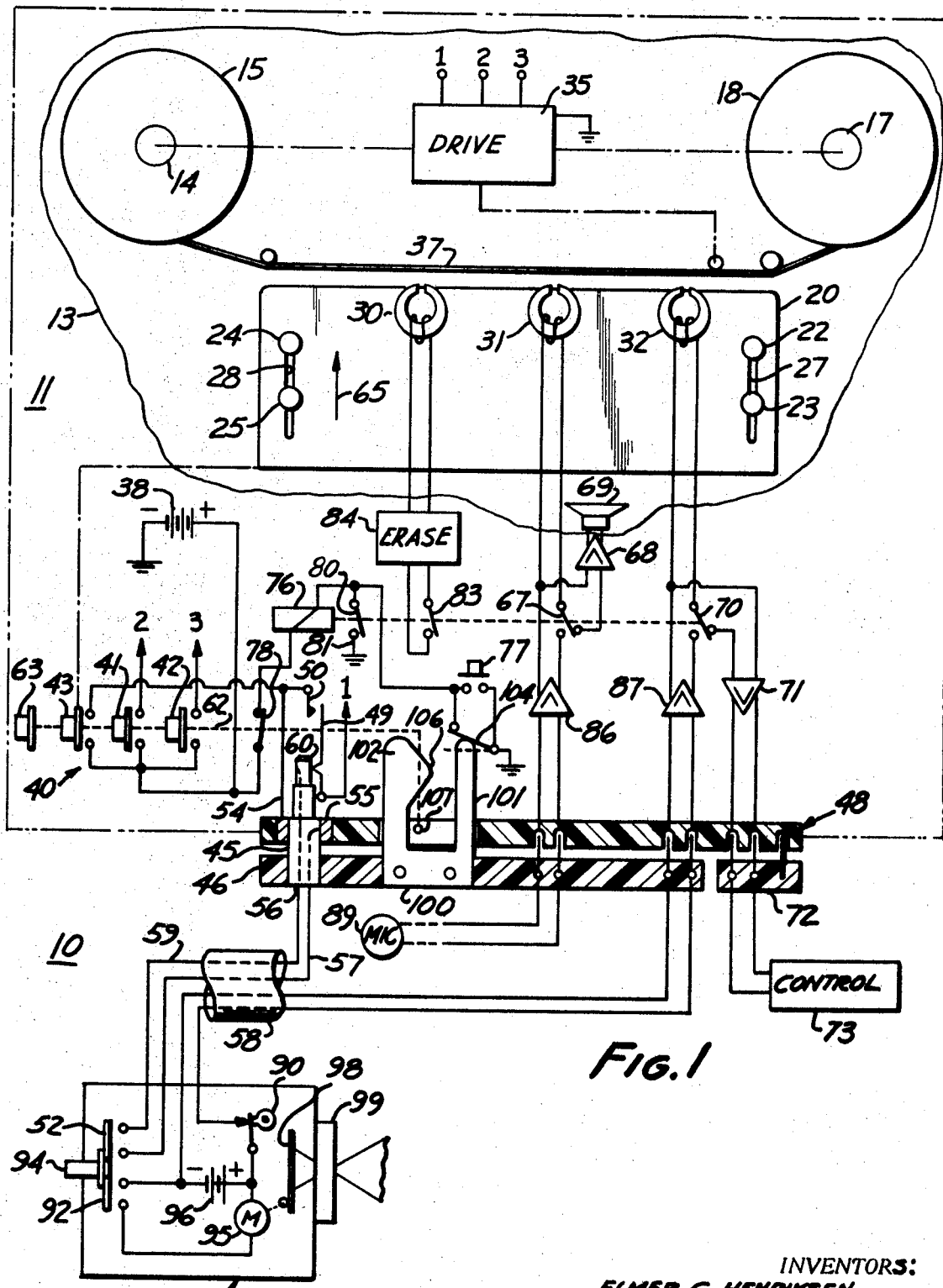
FIG. 1 is a diagrammatic view of an audiovisual recording system in accordance with a preferred embodiment of the invention.

The audiovisual recording system illustrated in FIG. 1 comprises a magnetic tape recorder 11 and a motion picture camera 93. Both of these apparatus may be of a conventional type except for the modifications according to the subject invention to be disclosed as this description proceeds.

The tape recorder 11 includes a base plate 13 and a rotatable shaft 14 for receiving a tape supply reel 15, as well as a rotatable shaft 17 for receiving a tape takeup reel 18.

A plate 20 is slidably mounted on the base plate 13 by two pairs of posts 22 through 24 which are attached to the base plate 13 and which extend through slits 27 and 28 in the plate 20. An erasing head 30, a sound recording and playback head 31, and a control signal recording and playback head 32 are mounted on the slidable plate 20.

The tape recorder 11 further includes a tape drive 35 which is equipped with an electric motor and conventional gear means (not shown) for driving the tape 39 at different speeds and in different directions. More specifically, the drive 35 advances a magnetic recording tape 37 from the reel 14 to the reel 18 at a speed suitable for sound recording or playback when the drive terminal 1 is energized from a source 38 of electric current.

On the other hand, the drive 35 advances the tape 37 at a fast forward speed when the drive terminal 2 is energized, and at a fast rewind speed when the drive terminal 3 is energized from the source 38.

Energization of the drive is controlled by a pushbutton assembly 40 which causes energization of the drive terminal 2 when a pushbutton 41 is depressed, and energization of the drive terminal 3 when a pushbutton 42 is depressed. Energization of the drive terminal 1 is initiated by depressing a pushbutton 43.

If a plug 45 of a remote control plug assembly 46 is removed from a recorder socket 48, a leaf spring 49 makes electrical contact with a leaf spring 50, so that the drive terminal 1 is energized directly upon an actuation of the pushbutton 43. On the other hand, if the plug 45 is present in the socket 48, the spring 29 is separated from the spring 50 and the energization of the drive terminal 1 is then controlled by actuation of a remote control switch 52, provided the pushbutton 43 is in its depressed state.

The energization circuit for the tape drive 35 by way of its terminal 1 can then be described as follows:

source 38, pushbutton 43, lead 54, socket 55, shell 56 of plug 46, lead 57 of remote control cable 58, remote control switch 52, lead 59 of cable 58, central plug contact 60, spring 49, terminal 1 of drive 35, ground, and back to the source 38.

The pushbutton assembly 40 includes a trip bar 62 which, when actuated, trips any of the pushbuttons 41, 42 and 43 from an actuated position to a rest position so as to terminate any recording, playback, fast forward or tape rewind operation of the tape recorder. The assembly 40 includes a further pushbutton 63 for actuating the trip bar 62, which will also be actuated when any of the buttons 41, 42 and 43 is depressed.

Pushbutton assemblies in which a depression of any button or key trips any other depressed button or key to a rest position are well known and are frequently used in such devices as radios (station selectors, waveband and function selectors), tape recorders and similar devices. Conventional assemblies of this type often include means, such as a specially slotted or apertured holding plate, for retaining a depressed pushbutton in its actuated state until it is tripped to its rest position by a movement of the trip bar or plate.

In the illustrated embodiment, the button 42 is so held in its actuated state so that tape rewinding takes place upon a depression of the button 42 and continues until the button 42 is tripped to its rest position by movement of the trip bar 62. Similarly, the pushbutton 43 is held in its actuated state until it is tripped to its rest position by movement of the trip bar 62.

In the illustrated embodiment, the pushbutton 43 is mechanically linked to the slidable plate 20 so that this plate is moved in the direction of the arrow 65 when the button 43 is depressed. In this manner, the heads 30, 31 and 32 are positioned into contact with the tape 37 for a recording or a playback operation. Since the button 43 remains in its actuated state until it is tripped, the heads 30, 31 and 32 remain in its engagement with the tape 37 until the trip bar 62 is moved to trip the button 43 to its rest position. Upon such tripping, the plate 20 moves back to its illustrated position, causing the heads 30 to 32 to separate from the tape 37.

For the moment it is assumed that the tape contains a magnetic sound recording in a sound track moving along the head 31, and a magnetic control signal recording in a control track moving along the head 32. Accordingly, if the plug 45 is removed from the recorder so that the spring 49 makes electrical contact with the spring 50, the recorder may be placed into a playback mode of operation by actuation of the pushbutton 43. Such actuation causes an energization of the tape drive 35 through its terminal 1 and along the following circuit:

source 38, pushbutton 43, spring 50, spring 49, terminal 1 of drive 35, ground, and back to the source 38.

If desired, a connector of the type of the plug 45 and a remote control including an actuator of the type of the switch 52 may be employed for a remotely controlled playback of signals from the tape 37.

In either case, sound signals reproduced by the head 31 from the tape 37 are applied by a switch 67 to an amplifier 68 for audible reproduction by a loudspeaker 69. Similarly, control signals reproduced from the tape 37 by the head 32 are applied by a switch 70 to an amplifier 71 and from there through a plug-in unit 72 to a control 73.

In accordance with features of the audiovisual display system disclosed in the above-mentioned Lancor application, the tape 37 may have sound accompaniments for motion pictures recorded in a sound track, and synchronization and sound termination signals recorded in a control track. Accordingly, motion picture sound accompaniments may be reproduced by the head 31, amplifier 68 and loudspeaker 69, while the head 32, amplifier 71 and control 73 cooperate in a synchronization of a simultaneous motion picture projection and a control of the sound reproduction in the manner disclosed, for instance, in the copending Lancor application just mentioned.

An illustrative example of the sound playback process having been given, various aspects of the sound recording process will now be considered.

To preset the recorder 11 for sound recording, a relay 76 is energized from the source 38. If the plug assembly 46 is removed from the recorder 11, the relay 76 is energized by momentarily depressing a pushbutton 77. Such actuation of the pushbutton 77 has to be effected while the pushbutton 43 is depressed. If the button 77 is depressed and then released before the button 43 is actuated, the movement of the trip bar 62 during the depression of the button 43 momentarily opens a contact 78, thereby interrupting the energization of the relay 76. This provides a safety feature against unintended erasures of information the tape 37. In brief, recording only takes place when both buttons 43 and 77 are in a depressed state at a common instant of time.

The relay 76 actuates a contact 80 in a self-holding circuit 81 so that it stays energized until the contact 78 is momentarily opened by movement of the trip bar 62. The relay 76 also closes a switch 83 to activate a source 84 of alternating current, and actuates the above-mentioned switches 68 and 70 so that the head 31 is connected to the output of an amplifier 86 while the head 32 is connected to the output of an amplifier 87.

The source 84, when activated by closure of the relay switch 83, energizes the head 30 to provide anhysteretic decaying fields at the moving tape 37 which, in a conventional manner, erase magnetically recorded information therefrom and thus prepare the tape for a fresh recording operation.

Actuation of the relay switch 67 permits sound picket up by a microphone 89 to be recorded by the head 31 on the sound track of the tape 37 after an amplification of the microphone current by the amplifier 86. Similarly, actuation of the relay switch 70 permits synchronization signals produced by a signal generator 90 to be recorded by the head 32 on a control track of the tape 37 after an amplification of the synchronization signals by the amplifier 87.

Assuming for the moment that the plug assembly 46 is disconnected from the recorder 11, it is seen that a sound recording operation can be effect upon a simultaneous depression of the pushbuttons 43 and 77, with the pushbutton 43 not only closing the energization circuit for the drive terminal 1, but also mechanically actuating the slidable plate 20 to cause engagement of the heads 30 to 32 with the tape 37. If the pushbutton 77 is not depressed, then no recording operation, but only a playback of information already recorded on the tape 37, will take place upon actuation of the pushbutton 43. This provides for a safeguard against unintentional erasure of information from the tape 37.

In practice, such a feature is highly desirable; however, it does have drawbacks if the recorder is used for the recording of sound accompaniments for motion picture sequences. This is best understood if the remote control switch 52 is assumed to be combined with relay switch 92 of a motion picture camera 93, and the signal generator 90 is assumed to be camactuated switch which, in the general manner described in the above-mentioned mentioned Lancor application, provides synchronization information which is recorded on the tape 37 and serves a scene-sound synchronization during the display of motion pictures and correlated sound accompaniments.

If the camera release button 94 is depressed, the switches 52 and 92 are closed. Closure of the switch 92 connects the camera drive motor 95 to a battery 96, so that the photosensitive film 98 in the camera 93 is advanced in a conventional manner and a shutter (not shown) is actuated to provide for a filming of motion picture features with the aid of a lens system 99. Closure of the switch 52 completes an energization circuit for the drive 35, at terminal 1, through the previously depressed pushbutton 43 and the jack 45, as described above.

In practice it has been found that a recording of sound accompaniments is frequently omitted if the camera operator, whose attention is occupied with the scene to be filmed, is required to actuate the button 77 in addition to the button 43 in order to preset the recorder 11 in a recording mode of operation.

The subject invention provides an important safety feature against such unintended omissions. According to the illustrated preferred embodiment, the plug assembly 46 includes a key 100 which has a first prong 101 and a second prong 102. The first prong 101 closes a normally open switch 104 when the plug assembly 46 is connected to the recorder 11. The switch 104 is in parallel to the pushbutton 77 and thus obviates an actuation of the latter. In brief, the key prong 101 causes a presetting of the recorder 11 into a recording mode of operation. The pushbutton 43 may then be depressed to cause movement of the heads 30 to 32 into contact with the tape 37 and to permit control of the tape drive 35 by the remote control switch 52 in the camera 93.

The second key prong 102 has a lateral protrusion 106 which temporarily engages an extension 107 of the trip bar 62 when the plug assembly 46 is being attached to the recorder, as well as when the plug assembly 46 is being detached from the recorder 11.

This provides for a further safety feature. If, for instance, the button 43 is in a depressed state for a playback operation when the plug assembly 46 is being attached to the recorder 11, or if the button 42 is in a depressed state for a tape rewind operation during such attachment, such button 42 or 43 is tripped to its rest position by the key prong 102 so as to clear the way for a recording operation. After such tripping, the pushbutton 43 has to be deliberately depressed preparatory to a sound accompaniment recording operation.

The operator of the camera 93 can thereupon apply this attention to the scene to be filmed, since the sound recording precess is remote controlled by the switch 52 once the plug assembly 46 is attached to the recorder 11 and the pushbutton 43 depressed.

When the plug assembly 46 is removed from the recorder 11, the key prong 102 trips the button 43 and interrupts the energization of the relay 76 through a temporary opening of the switch 78 by movement of the trip bar 62. In this manner, the danger is obviated that the relay 76, through its self-holding circuit 81, maintains the recorder in a recording mode of operation beyond the international recording of sound accompaniments.

It will now be recognized that the subject invention provides essential features for sound recorders and particularly for audiovisual recording equipment.

If desired, mechanical means maybe substituted for the self-holding relay 76. This illustrated in FIGS. 2 and 3 which show relevant portions of the recorder 11.

Figure 2:
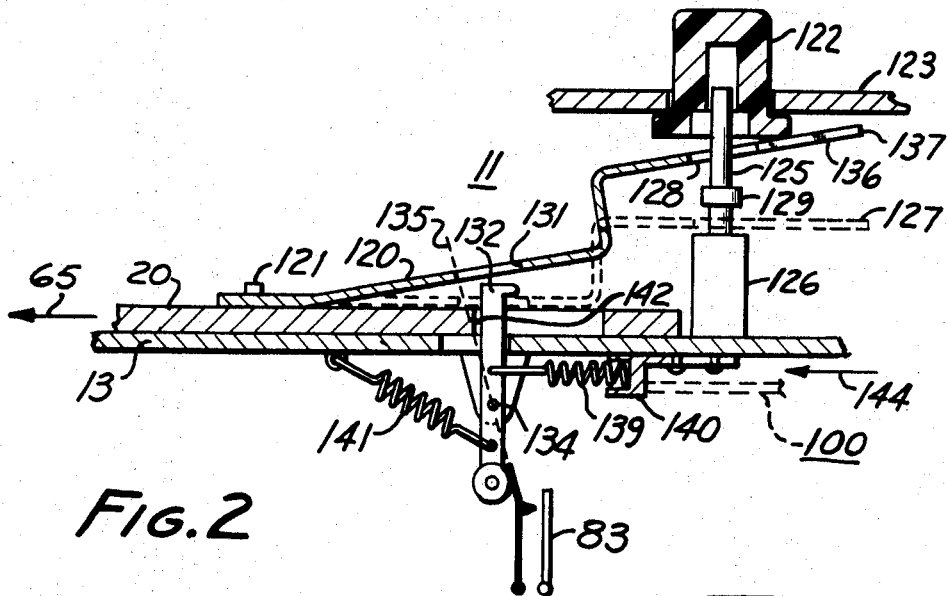
FIG. 2 illustrates a first modification of the system of FIG. 1.

According to FIG. 2, the above-mentioned plate 20, which is slidable on the base plate 13, has a leaf spring 120 attached thereto at 121. The spring 120 biases a pushbutton 122 against parts of a cover 123 for the recorder 11. The button 122 rides on a pin 125 which projects from a post 126 affixed to the base plate 13.

When the button 122 is depressed, the recorder 11 is preset for a recording mode of operation by movement of the spring 120 to a position 127 illustrated in FIG. 2 by dotted lines. More specifically, as the spring is moved to its position 127, an aperture 128 provided therein moves past an annular ridge 129 of the pin 125 so as to encompass this pin below such ridge. While this is taking place, a slit 131 in the spring 120 moves over a switch actuator 132.

If now the plate 20 is advanced in the direction of the arrow 65 by actuation of the pushbutton 43 shown in FIG. 1, the spring 120 moves in the same direction and, if in its depressed position 127, rotates the switch actuator 132 about a pivot 134 to an active position indicated by a phantom line 135.

In such active position, electrical contacts such as the contacts 83, 67 and 70 shown in FIG. 1 are actuated so as to place the recorder 11 into a recording mode of operation, as distinguished from a playback mode of operation.

While the switch 132 is being actuated, a pair of end portions 136 of the spring 120 separated by a slit 137 which is narrower than the diameter of the aperture 128, slides in between the annular ridge 129 and the post 126 as the spring 120 moves with the plate 20 in the direction of the arrow 65. This retains the spring 120 in the depressed position until the pushbutton 43 is tripped and the plate 20 moves back to its illustrated position. Once the slit 137 has cleared the annular ridge 129 so that the aperture 128 is located below such ridge, the spring 120 snaps back to its rest position illustrated in solid lines.

If actuation of the button 122 is omitted, the spring 120 will remain in its rest position and will thus not actuate the switch 132 as the plate 20 is moved. Accordingly, the recorder 11 will be placed in a playback mode of operation of the pushbutton 43 is thereupon depressed.

The parts of FIG. 2 described so far and their function are known in the tape recorder art. According to a preferred embodiment of the subject invention, a compression spring 139 has one end thereof attached to the switch actuator 132 and the other end mounted in a slidable member 140.

A bias spring 141 normally holds the switch actuator 132 in its illustrated position, even when the portion 142 of the plate 20 moves in the direction of the arrow 65 when the plate 20 is actuated in such direction. Of course, if the spring 120 is depressed by actuation of the button 122 prior to movement of the plate 20, then this spring 120 advances the actuator 132 as described above to place the recorder 11 in a recording mode of operation.

Similarly, if the plug assembly 46 shown in FIG. 1 is attached to the recorder 11, the key 100 thereof, having prongs 101 and 102, engages the member 140 and slides the same in the direction of an arrow 144. This compresses the spring 139 so that the switch actuator 132 will, despite the presence of the spring 141, move to its active position 135 when the plate 20 and plate portion 142 move in the direction of the arrow 65.

It will now be seen that insertion of the key 100 into the recorder 11 presets the recorder for a recording mode of operation (compression of spring 139), which mode is executed (movement of plate portion 142, movement of actuator 132, closure of switches 83, etc.) as the Record/Playback button 43 is depressed.

Figure 3:
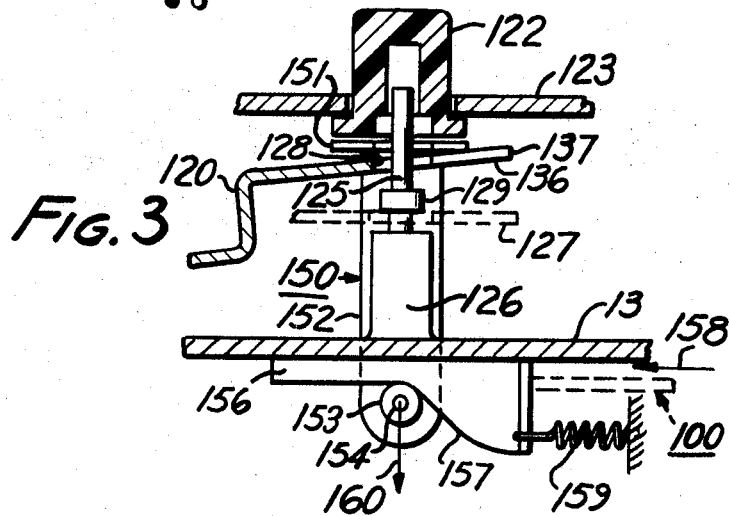
FIG. 3 illustrates a second modification of the system of FIG. 1.

The embodiment illustrated in FIG. 3 is similar to that of FIG. 2 so that like reference numerals are employed among these two figures to designate like parts.

According to FIG. 3, a spring actuator 150 has an upper flange 151, a vertical portion 152 descending laterally from the upper flange, and a roller 153 mounted on the lower portion of the portion 152 by a pin 154. The actuator 150 extends through a slit (not shown) in the base plate 13 and, as its name implies, serves to actuate the spring 120 to its active position 127 when the key 100 is inserted into the recorder during an attachment of the plug assembly 46 (see FIG. 1).

In the case a member 156 defining a ramp 156 is pushed by the key 100 in the direction of an arrow 158 against the bias of a spring 159. The roller 153 is thereby caused to ride along the ramp 157, causing the actuator 150 to be moved downwardly in the direction of the arrow 160, unit the flange 151 has advanced the spring 120 to its active position 127.

The remaining operation of the embodiment of FIG. 3 is the same as that described above for the embodiment of FIG. 2. In both of these embodiments, the key 100 may be configured so as to provide for the above mentioned tripping feature during attachment and during removal of the plug assembly 46.

Figure 4:
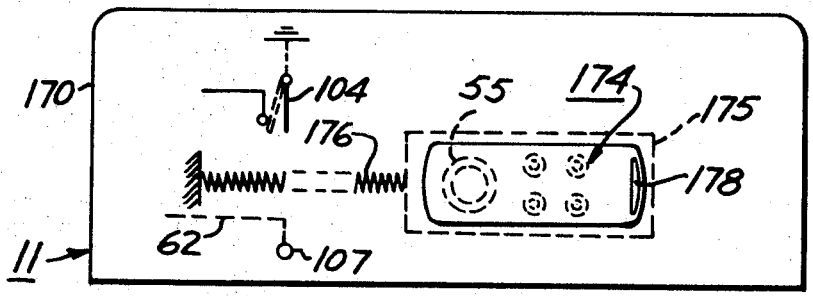
FIG. 4 illustrates a third modification of the system of FIG. 1.

According to FIG. 4, a housing 170 of the tape recorder 11 defines an opening 171 behind which a socket assembly 172 is mounted. This assembly includes a jack 55 shown in FIG. 1, as well as sockets 174 for access to the amplifiers 86 and 87 illustrated in that figure. The jack 55 and sockets 174 are normally covered by a sliding door 175 biased to its illustrated rest position by a spring 176.

The door 175 has a handle 178 which permits manual actuation of the door against the bias of the spring 176, until the jack 55 and sockets 174 are exposed for insertion thereinto of the plug 45 and of pins connecting the microphone 89 to the amplifier 86 and the control signal generator 90 to the amplifier 87, as shown in FIG. 1.

As the door 175 is slid to the left, it closes the above-mentioned contact 104 and engages the trip bar extension 107 for movement the trip bar 62. As disclosed in connection with FIG. 1, closing of the switch 104 presets the recorder 11 into a recording mode of operation, as distinguished from a playback operation, and movement of the trip bar 62 deactivates any previously selected operation so as to clear the way for execution of the preset recording operation.

It will now be recognized that the sliding door 175 is an analog to the key 100 described above.

While specific embodiments have been described and illustrated herein, various modifications within the spirit and scope of the subject invention will be apparent or suggest themselves to those skilled in the art.

1. In an information recording system:
    a. recording apparatus for recording information on magnetic recording tape, including:
        1. selectively actuable first means for moving said tape;
        2. selectively actuable second means for recording, in a recording mode of operation, information on a said moving tape, and for reproducing, in a playback mode of operation, recorded information from a said moving tape; and
    b. remote control means including:
        1. means for providing control signals for actuating said first means; and
        2. means for conveying in said control signals to said first means, said conveying means being attachable to and detachable form said recording apparatus and including means for presetting said second means to said recording mode of operation upon an attachment of said conveying means to said recording apparatus irrespective of the prior setting of the recorder operational mode.

2. A system as claimed in claim 1, wherein:
    a. said second means are adapted to be tripped to a quiescent state other than said recording and said playback modes of operation; and
    b. said conveying means include means for tipping said second means to said quiescent state upon a detachment of said conveying means from said recording apparatus.

3. A system as claimed in claim 1, wherein:
    a. said second means are adapted to be tripped to a quiescent state other than said recording and said playback modes of operations; and
    b. said conveying means include means for tripping said second means to said quiescent state during each attachment and during each detachment of said conveying means to and from said recording apparatus.

4. A system as claimed in claim 1, wherein said recording apparatus includes manually actuable means for selectively actuating said second means to said recording mode of operation while said conveying means are detached from said recording apparatus.

5. A system as claimed in claim 1, wherein said recording apparatus includes:
    a. first manually actuable means for selectively actuating said first means while said conveying means are detached from said recording apparatus; and
    b. second manually actuable means for selectively actuating said second means to said recording mode of operation while said conveying means are detached from said recording apparatus.

6. A system as claimed in claim 5, wherein said first and second manually actuable means are combined with each other so that said first and second manually actuable means have to be actuaged simultaneously for an actuation of said second means to actuated recording mode of operation.